United States Patent [19]

Croissant, Jr.

[11] 4,223,591

[45] Sep. 23, 1980

[54] ADJUSTABLE MOUNT FOR GUN POD AND THE LIKE

[75] Inventor: Carl W. Croissant, Jr., Long Beach, Calif.

[73] Assignee: Ford Aerospace & Communications Corp., Dearborn, Mich.

[21] Appl. No.: 948,926

[22] Filed: Oct. 5, 1978

[51] Int. Cl.³ .................................... B64D 7/00
[52] U.S. Cl. .................................... 89/37.5 L
[58] Field of Search ............. 89/37.5 L; 244/137 R

[56] References Cited

U.S. PATENT DOCUMENTS

| | | | |
|---|---|---|---|
| 2,347,406 | 4/1944 | Frazer-Nash | 89/37.5 L |
| 2,493,945 | 1/1950 | Cocks et al. | 89/37.5 L |
| 3,041,913 | 7/1962 | Liska | 85/1 |
| 3,100,316 | 8/1963 | Boiu | 16/105 |
| 3,377,877 | 4/1968 | Eaton | 74/395 |
| 3,954,233 | 5/1976 | Hasquenoph et al. | 244/137 R |

FOREIGN PATENT DOCUMENTS 553296   5/1943   United Kingdom ................ 89/37.5 L Primary Examiner—Stephen C. Bentley
Attorney, Agent, or Firm—Steven L. Permut; Clifford L. Sadler

[57] ABSTRACT

A mounting device for a gun pod has a threaded bolt with a head fixed to an airplane wing. The threaded bolt engages a threaded aperture of an inner sleeve rotatably mounted in an aperture of a middle sleeve. The aperture of the middle sleeve is eccentric with respect to the axis of rotation thereof. The middle sleeve is rotatably mounted in an aperture through an outer sleeve. The aperture through the outer sleeve is also eccentrically positioned the same amount from the axis of the outer sleeve. The outer sleeve is rotatably mounted in a retainer mounted in an aperture in the gun pod. The gun pod is also pivotably mounted to the airplane wing at a position spaced from the mounting device such that adjustment of the mounting device adjusts the vertical and azimuth angles of the gun pod with respect to the wing.

7 Claims, 5 Drawing Figures

ADJUSTABLE MOUNT FOR GUN POD AND THE LIKE

BACKGROUND OF THE INVENTION

1. Field of the Invention

This invention relates to a mechanical adjustment and alignment mechanism. More particularly, it relates to a combination of a threading mechanism and eccentric sleeves to accomplish horizontal and vertical adjustments.

2. Description of the Prior Art

Eccentric bores through nuts have long been used to compensate for any deviation between two misaligned apertures in two objects which must be bolted together. Conventionally, one or both of the eccentric bolts are rotated until their threaded holes are in alignment, to thereby compensate for the fact the holes that receive the nuts are out of alignment. Such a device using a nut mounted in each of two different objects with each nut having an eccentric bore is disclosed in U.S. Pat. No. 3,041,913 issued to Liska on July 3, 1962. A threaded bolt extends through the eccentric bore of one of the nuts and threadably engages a threaded eccentric bore of a second nut to mount the first object to the second object.

U.S. Pat. No. 3,100,316 issued to Biou on Aug. 13, 1963 discloses an eccentrically positioned lug mounted on a rotatable disc of a door hanger which controls the height of the door hanging from said hanger.

U.S. Pat. No. 3,377,877 issued to Eaton on Apr. 16, 1968 discloses eccentrically placed pins, which are adjustable by rotation to cause two gears to be aligned.

SUMMARY OF THE INVENTION

According to the invention, an adjusting mechanism adjusts the distance and alignment of a first object with respect to a second object. The adjusting mechanism comprises a first sleeve mount rotatably mounted to the first object. In one embodiment, the first sleeve is rotatably mounted in a hole through the first object. The first sleeve has a hole with a circular cross section eccentrically offset from the axis of rotation of the first sleeve. The second sleeve has a circular cross section and is rotatably received in the first sleeve. The second sleeve similarly has a hole having a circular cross section with the hole being eccentrically offset from the axis of rotation of the second sleeve. A third sleeve having a circular cross section is rotatably received in the second sleeve. The third sleeve has a central cylindrical aperture which longitudinally extends therethrough. In one embodiment the aperture through the third sleeve is threaded.

Further, according to the invention, a bolt is fixedly engaged to the second object and fixedly engagable in a plurality of positions to the cylindrical aperture in the third sleeve for adjusting the distance between the first and second objects. In one embodiment the bolt engages the threaded aperture in the third sleeve.

The third sleeve is rotatable with respect to the bolt. The first and second sleeves are also rotatable with respect to each other and with respect to the first object.

In one embodiment, the holes of the first object, the first sleeve and second sleeve are cylindrical apertures extending longitudinally through the respective object and sleeves. The first, second and third sleeves are also cylindrical in shape and adapted to be rotatably mounted in the object, first, and second sleeves respectively.

In one embodiment, the first sleeve has a wrench engaging head at the top thereof. The second sleeve has a wrench engaging head at the top thereof extending above the first wrench engaging head. The third sleeve has a wrench engaging head at the top thereof extending above the wrench engaging head of the second sleeve.

In one specific embodiment, the first object is pivotably mounted to the second object at a point spaced from the said adjusting mechanism. The first and second sleeves can be rotatable in equal amounts and opposite directions such that the first object pivots with respect to the second object about its pivot point in a substantially transverse line with respect to the axis between the pivot point and adjusting mechanism.

In one embodiment, the adjusting mechanism adjusts the azimuth and elevation of a gun pod pivotably connected to a supporting structure wherein a gun is fixedly mounted within the gun pod and substantially covered by the gun pod. The adjusting mechanism is engagable from the exterior of the gun pod. Adjustments can be made from one location to adjust both the horizontal and vertical directions of the gun pod.

BRIEF DESCRIPTION OF THE DRAWINGS

Reference now will be made to the following drawings.

DETAILED DESCRIPTION OF THE PREFERRED EMBODIMENT

Figure 1:
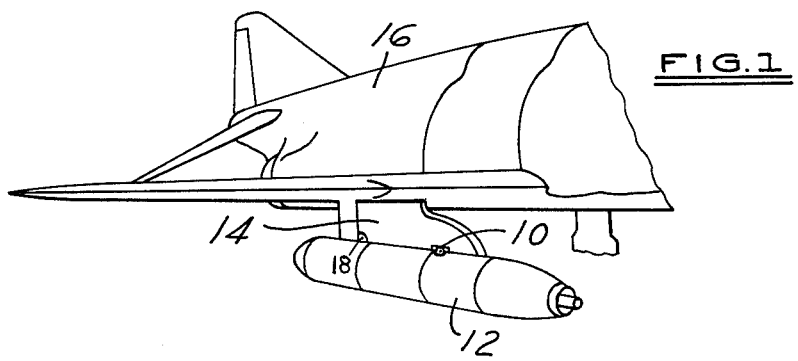
FIG. 1 is a perspective view of one embodiment of the invention as shown in the preferred setting.

Referring to FIG. 1, an adjusting mechanism 10 connects a gun pod 12 to a support member 14 attached to a wing 15 of an airplane 16. To the rear of an adjusting mechanism 10 is a pivotable connection 18 which pivotably connects the gun pod to the support member 14.

Figure 3:
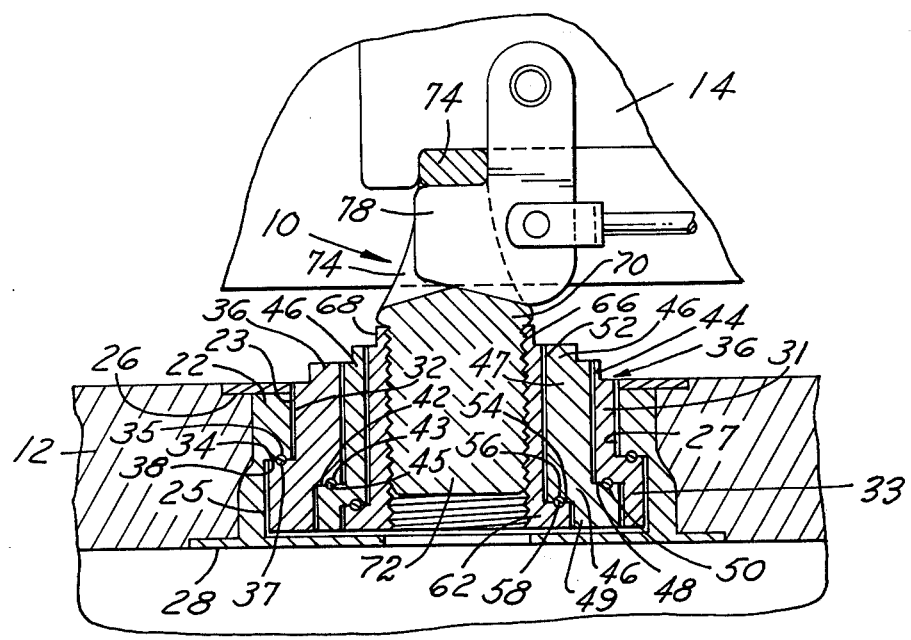
FIG. 3 is a side elevational cross sectional view of the embodiment shown in FIG. 2.
Figure 2:
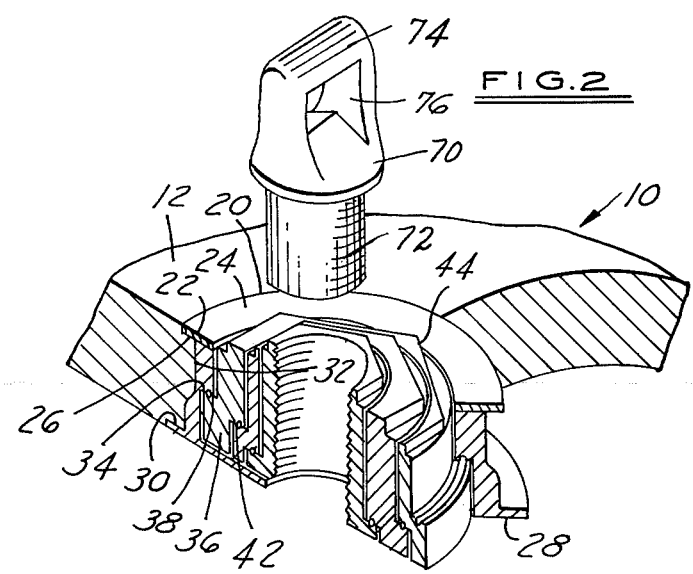
FIG. 2 is an enlarged perspective partially segmented view of the embodiment shown in FIG. 1.
Figure 4:
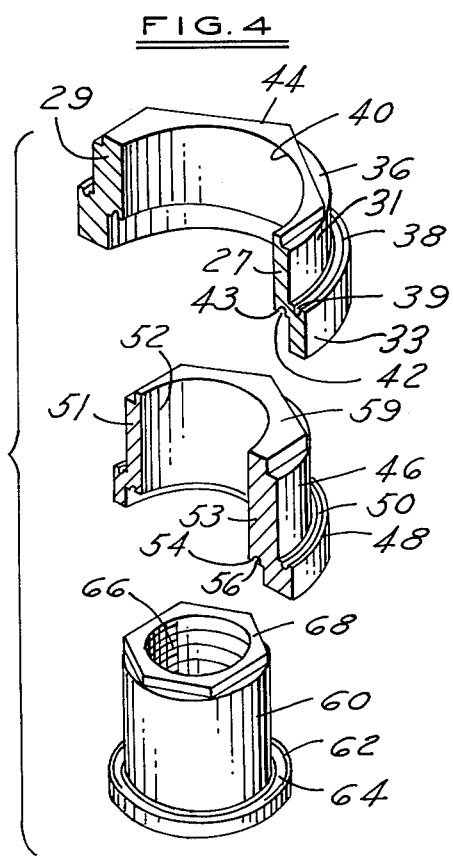
FIG. 4 is a partially segmented fragmentary and exploded view of the three sleeves shown in FIG. 2.

Referring now to FIGS. 2, 3 and 4, the gun pod 12 has a circular aperture 20 therethrough. A retainer 22 is fitted within the aperture 20. The retainer 22 has an upper flange 24 which extends over a shoulder 26 of the gun pod 12. The retainer 22 also has a lower flange 28 which extends under a shoulder 30 of the gun pod. The lower flange 28 extends substantially radially inward toward the central axis of the retainer 22. The retainer 22 has a central aperture 32 therethrough. The retainer has a radially inner upper portion 23 and a lower radially outer portion 15. An annular shoulder 34 circumferentially extends around the axis of the retainer 22 between the portion 23 and 25. The shoulder 34 has a groove 35 therein which forms a race adapted to receive the balls 37 of a ball bearing.

Within the aperture 32 is a sleeve 36. The sleeve 36 has an upper cylindrical portion 31 and a lower radially larger lower cylindrical portion 33. The sleeve 36 has an outwardly extending shoulder 38 which extends under the shoulder 34 of the retainer between the two sections 31 and 33. The sleeve also has an aperture 40 therethrough. An annular shoulder 42 circumscribes the aperture 40. The outwardly extending shoulder 38 has a groove 39 therein which forms a race adapted to receive the bearing balls 37. Similarly, the shoulder 42 has a bearing race 43 therein adapted to receive the balls 45 of a second ball bearing. The top of the sleeve 36 has a hexagonal wrench engaging head 44. The aperture 40 is eccentrically displaced from the central axis of the sleeve 36 such that the sleeve 36 has a thinner side wall 27 and a thicker side wall 29.

A second sleeve 46 has an upper cylindrical section 47 and a lower cylindrical portion 49 with a larger diameter. An outwardly extending shoulder 48 with groove 50 therein joins the sections 47 and 49. The shoulder 48 fits under the complementary shoulder 42 of sleeve 36 with the ball bearings 45 fitting within the two grooves of races 43 and 50. The sleeve 46 has an aperture 52 therethrough which is eccentrically displaced from the central axis of the sleeve 46 the same distance as the aperture 40 is displaced from the central axis of sleeve 36 such that sleeve 46 has a thinner side wall 51 and a thicker side wall 53. A shoulder 54 circumscribes the aperture. The shoulder 54 has a groove 56 therein which is adapted to receive a set of ball bearings 58. The sleeve 46 has a wrench engaging head 59 at its top end which extends above the wrench engaging head 44 of sleeve 36.

A third sleeve 60 has an outwardly extending shoulder 62 which has a groove 64 therein. The shoulder 62 is adapted to abut shoulder 54 of sleeve 46 with ball bearings 58 situated therebetween. The sleeve 60 has an internally threaded aperture 66 which is symmetrically located about the central axis of the sleeve 60. The top end of the sleeve 60 has a wrench engaging head 68 which extends above the wrench engaging head 59 of sleeve 46.

As shown in FIGS. 2 and 3 a lug 70 has a threaded bottom end 72 adapted to threadably engage the aperture 66. The top end 74 has an aperture 76 along a vertical plane.

Referring to FIG. 3, the lug 70 has its threaded end adjusts threadably engaging the aperture 66 with the top end 74 having the aperture 76 receiving a protrusion 78 extending from the support member 14 to fix the lug with respect to the support member 14.

In operation, the threaded sleeve 66 is threadably rotatable about the lug 70 and the two eccentric sleeves 46 and 44 are rotatable with respect to each other and with respect to the sleeve 66 and the gun pod 12.

The rotation of the threaded sleeve 66 with respect to the lug controls the height of the gun pod 12 with respect to the support member 14. More specifically, rotation of the sleeve actually controls the angle along the vertical plane of the gun pod with respect to the support member. The rear portion of the gun pod is pivotably mounted about pivotable connection 18 and the gun pod 12 pivots about this connection 18 along a vertical plane.

Rotation of the two sleeves 36 and 46 in equal but opposite directions adjusts the gun pod 12 along an azimuth. The azimuth adjustment centers about the pivot point 18 without any substantial longitudinal motion of the gun pod resulting from the transverse adjustment even though eccentrics are employed.

Figure 5:
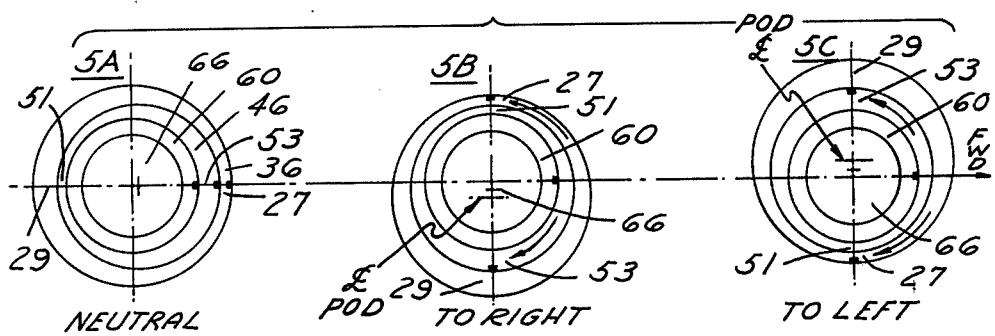
FIGS. 5(a), 5(b) and 5(c) are a series of schematic diagrams illustrating the movement of the sleeves to achieve proper azimuth adjustments.

Reference is now made to FIGS. 5(a) and 5(c) in describing how the sleeves 36 and 46 rotate. Sleeve 36, as shown in FIG. 5(a) has its thinnest portion 27 facing directly forward and aligned with the thickest portion 53 of sleeve 46. Rotation in equal but opposite directions of the sleeves 36 and 46 will adjust the center of the aperture 66 in sleeve 60 in a lateral direction with the forward and rearward directions being cancelled out by the opposite movements of the eccentrically placed apertures 40 and 52, respectively.

As shown in FIG. 5(b), the gun pod can be displaced to a maximum right position (which is in a down direction in the figures) with the outer sleeve being rotated in a counter clockwise direction 90° and the inner sleeve being rotated in a clockwise direction by 90°. As shown in FIG. 5(c), the maximum adjustment to the left (in an upward direction as shown in the figure) can be accomplished by the outer sleeve being rotated in a clockwise direction 90° and the inner sleeve rotated in a counter clockwise direction by 90°. If smaller lateral adjustments are desired, the sleeves 36 and 46 can be moved any angle between 0° and 90° depending on the extent of the adjustment desired.

The lateral or azimuth adjustment of the gun pod is totally independent from the vertical adjustment of the gun pod through the rotation of sleeve 60 about lug 70. In this fashion, any combination of an azimuth adjustment and a vertical adjustment can be made at the single adjustment mechanism 10.

In this fashion, an adjustment device adjusts both the vertical and lateral directions of a gun pod with respect to a support member without entering the interior of the gun pod 12.

Variations and modifications can be made within the scope of the foregoing disclosure and drawings without departing from the spirit of the invention which is defined by the appended claims.

I claim:
1. An adjusting mechanism for adjusting the distance and alignment of a first object with respect to a second connected object comprising:
   a first sleeve with a circular cross section rotatably mounted to the first object;
   said first sleeve having a hole with a circular cross section therein.
   said hole having an axis offset from the axis of rotation of the first sleeve;
   a second sleeve having a circular cross section rotatably mounted in the hole of the first sleeve;
   the second sleeve having a hole with a circular cross section therein;
   said hole of the second sleeve having an axis offset from the axis of rotation of the second sleeve;
   a third sleeve with a circular cross section rotatably mounted in the third hole.
   said third sleeve having a central cylindrical aperture longitudinally extending therethrough;
   means for retaining the first, second and third sleeves rotatably mounted with respect to each other;
   a bolt means fixed to the second object and extending in the cylindrical aperture;
   means for adjusting the bolt means relative to the apertures in a plurality of longitudinal fixed positions;
   means for rotating the first and second sleeves with respect to each other and with respect to the first object such that first object is moved with respect to the second object in a direction transverse to the axis of the bolt means.

2. An adjusting mechanism as defined in claim 1 wherein the means for longitudinally adjusting the bolt means includes the bolt means having a threaded shaft portion and the aperture being complementarily threaded such that the bolt means threadably engages the aperture and rotation of the said third sleeve with respect to the bolt means adjusts the longitudinal position thereof.

3. An adjusting mechanism as defined in claim 1 wherein; said holes are cylindrical apertures extending through the respective first and second sleeves; the first, second and third sleeves have substantially cylindrical surfaces.

4. An adjusting mechanism as defined in claim 3 wherein said first object has a circular hole therethrough, said first sleeve being rotatably mounted therein; and said retaining means includes: a first radially outwardly extending shoulder on the lower end of the first sleeve abutting an under surface of said hole in the first object; a second radially outwardly extending shoulder on the lower end of the second sleeve abutting an under surface of the first sleeve; a third radially outwardly extending shoulder on the lower end of the third sleeve abutting an under surface of the second sleeve; the shoulders adapted to prevent the sleeves from being pulled upwardly out of the first object; and a flange at the lower end of the hole in said first object extending radially inwardly to abut and support the bottoms of the three sleeves from falling downwardly through said hole.

5. An adjusting mechanism as defined in claim 3 wherein the means for rotating the first and second sleeves include:
a wrench engaging head at the top of the first cylindrical sleeve; a second wrench engaging head at the top of the second sleeve extending above the first wrench engaging head; and
the means for adjusting the third sleeve with respect to the bolt means includes a third wrench engaging head at the top of the third sleeve extending above the second wrench engaging head.

6. An adjusting mechanism as defined in claim 1 further comprising:
pivotable means for pivotably mounting the first object to the second object at a point spaced from the adjusting mechanism;
the distance the axis of said hole in the first sleeve is offset from the axis of rotation of the first sleeve is equal to the distance of said hole in the second sleeve is offset from the axis of rotation of the second sleeve; the first and second sleeve are rotatable in opposite directions such that the first object pivots with respect to the second object about the pivotable means in a direction substantially transverse to the line containing the pivot point and adjusting mechanism and also transverse to the direction of adjustment of the bolt means with the third sleeve.

7. A gun adjusting mechanism for adjusting the azimuth and elevation of a gun pivotably connected to a support structure comprising:
means for fixedly mounting the gun to a gun pod substantially covering the gun;
means for pivotably mounting the gun pod to the support structure;
means connected to the gun pod and support structure spaced away from the pivoting means for adjusting the gun pod azimuth and elevation from one location on the exterior of the gun pod;
said adjusting means includes:
one of the gun pods or support structures having a first hole of circular cross section therein;
a first sleeve with a circular cross section rotatably mounted in the first hole;
the first sleeve having a second hole with a circular cross section therein;
the second hole having an axis offset from the axis of rotation of the first sleeve;
a second sleeve having a circular cross section rotatably mounted in the second hole;
the second sleeve having a third hole with a circular cross section therein;
the third hole having an axis offset from the axis of rotation of the second sleeve;
a third sleeve with a circular cross section rotatably mounted in the third hole;
the third sleeve having a central cylindrical and threaded aperture longitudinally extending therethrough;
a bolt means fixed to the other of the gun pod or support structure in a substantially vertical direction and threadably engaging the aperture means for the rotating the third sleeve with respect to the bolt means from adjusting the elevation of the gun with respect to the support structure; and
means for rotating the first and second sleeve with respect to each other and with respect to the gun pod and support structure such that the gun pod is pivoted from its pivotable connection to the support structure in a substantially lateral direction to control the azimuth of the gun.

* * * * *